(12) United States Patent
Seo

(10) Patent No.: US 7,016,491 B2
(45) Date of Patent: Mar. 21, 2006

(54) TELEPHONE WITH CANTILEVER BEAM TYPE CRADLE AND HANDSET CRADLED THEREON

(75) Inventor: Ho-Kyung Seo, Suwon-shi (KR)

(73) Assignee: Samsung ElectronicsCo., Ltd., Suwon-si (KR)

(*) Notice: Subject to any disclaimer, the term of this patent is extended or adjusted under 35 U.S.C. 154(b) by 415 days.

(21) Appl. No.: 10/107,058

(22) Filed: Mar. 28, 2002

(65) Prior Publication Data

US 2003/0012367 A1    Jan. 16, 2003

(30) Foreign Application Priority Data

Jul. 11, 2001    (KR) ............................... 2001-41635

(51) Int. Cl.
   *H04M 1/00* (2006.01)
(52) U.S. Cl. .............................. 379/428.01; 379/428.03
(58) Field of Classification Search ............... 379/435, 379/436, 428.01, 428.03, 420.01
   See application file for complete search history.

(56) References Cited

U.S. PATENT DOCUMENTS

| | | | |
|---|---|---|---|
| D278,813 S | 5/1985 | Genaro et al. | |
| D280,617 S | 9/1985 | Inaba | |
| 4,598,175 A * | 7/1986 | Read ........................... | 379/435 |
| D301,474 S | 6/1989 | Hotsumi et al. | |
| 4,856,045 A | 8/1989 | Hoshina | |
| 5,008,924 A * | 4/1991 | Guichard et al. ...... | 379/428.03 |
| 5,086,466 A | 2/1992 | Gumb et al. | |
| D328,076 S | 7/1992 | Hagiwara | |
| 5,187,743 A * | 2/1993 | Gumb et al. ................. | 379/436 |
| D348,265 S | 6/1994 | Nagele | |
| D354,287 S | 1/1995 | Tokiyama | |
| 5,416,838 A * | 5/1995 | Liebing et al. ............. | 379/436 |
| D359,283 S | 6/1995 | Rudkiewicz | |
| 5,568,548 A | 10/1996 | Repplinger et al. | |
| D398,302 S | 9/1998 | Lio | |
| D402,977 S | 12/1998 | Lytel | |
| 6,453,046 B1 * | 9/2002 | Madav ....................... | 379/436 |

FOREIGN PATENT DOCUMENTS

| | | |
|---|---|---|
| DE | 35 13 698 A1 | 10/1986 |
| DE | 39 13 273 A1 | 10/1990 |
| DE | 43 31 669 A1 | 3/1994 |
| DE | 195 01 774 A1 | 8/1996 |
| GB | 2 271 038 | 3/1994 |

OTHER PUBLICATIONS

"Search Report" issued by European Patent Office dated on Aug. 14, 2003.

* cited by examiner

*Primary Examiner*—Jack Chiang
(74) *Attorney, Agent, or Firm*—Robert E. Bushnell, Esq.

(57) ABSTRACT

A telephone comprising: a planar housing; a planar support connected to the planar housing to rotationally support the planar housing; a cantilever beam type cradle on which a handset is to rest, the cradle being extended to one side of the planar support; and an angled support connected to the bottom part of the planar support for supporting the planar support at a predetermined acute angle.

20 Claims, 7 Drawing Sheets

TELEPHONE WITH CANTILEVER BEAM TYPE CRADLE AND HANDSET CRADLED THEREON

CLAIM OF PRIORITY

This application makes reference to, incorporates the same herein, and claims all benefits accruing under 35 U.S.C. § 119 from my application Telephone With Cantilever Beam Type Cradle And Cradled Handset Therein filed with the Korean Industrial Property Office on 11 Jul. 2001 and there duly assigned Serial No. 41635/2001.

BACKGROUND OF THE INVENTION

1. Field of the Invention

The present invention relates to a telephone including an image phone, a picture phone, a web phone, a web video phone and an Internet communication phone. In particular, the present invention relates to a telephone with a cantilever beam type cradle and a handset cradled thereon.

2. Related Art

Normally, what "a phone" indicates is a wire telephone including either a phone in a general sense for telecommunicating with another person or a key-phone, using a curl cord that connects a handset to a main body. Such handset is equipped with a transmitting portion (hereafter: transmitter) at a lower end of the handset and a receiving portion (hereafter: receiver) at an upper end of the handset. The main body of the phone is equipped with a cradle for the transmitter and a cradle for the receiver. See for example, U.S. Pat. No., Des. 348,265 to Albert L. Nagele entitled Secure Telephone Cradle. Also, the cradle for the receiver has an on/off hook switch, which takes either side depending on whether the handset is back to its position or not. See for example U.S. Pat. No. Des. 280,617 to Hiroshi Inaba entitled Telephone Set. Sometimes, the cradle for the receiver has a hanger also.

Recently, an Internet communication using a telephone has been chiefly made. Thus, it is easy to find Internet telephones anywhere, such as, "data processing telephones," "image telephones" or "Internet communication telephones". See for example, U.S. Pat. No. Des. 328,076 to Natsuki Hagiwara entitled Telephone Set Having Data Processing Function, U.S. Pat. No. Des. 402,977 to Ronald Leroy Lytel entitled Telephone Base; and U.S. Pat. No. Des. 398,302 to Cheng Lio entitled Video Telephone.

FIG. 1 illustrates one of the typical Internet communication telephones in the related art. As shown in FIG. 1, the main body 100 of the telephone for Internet communication has a wide LCD housing 102 in which a wide LCD 102a is installed. And, a plurality of button keys 104 are arrayed below the wide LCD 102a. Here, the wide LCD 102a is used as a data output means, and the button keys are used as a data input means. On the left side of the wide LCD 102a, there is a cradle where the handset 110 is cradled. The cradle includes two caved-in spaces 106 and 108 for the receiver 112 and the transmitter 114 of the handset 110 to be cradled, respectively.

The wide LCD 102a rotates at a designated angle around a hinge axis A. Hence, after inputting data simply by pressing the buttons with a finger during the Internet communication, a user can check the data displayed in a comfortable position. In addition, a weight balance W is installed on behalf of the weight balance of the handset 110 and a more precise on/off function of the hook switch 109. Since the operating method of the hook switch 109 of the telephone is well known to those skilled in the art, it is not described here in detail.

A number of the users of the aforementioned Internet communication telephone, however, confess that it was often uncomfortable to pick up the handset from the cradle. In other words, the Internet communication telephone requires by its nature a wider LCD screen, but when such LCD is installed, it becomes more difficult for the user to pick up the handset avoiding the wide LCD. Trying not to touch the LCD in any way, he or she soon realizes that it is very uncomfortable to pick up the handset without actually contacting the LCD. In reality, the LCD window is almost always interfered with by a hand of the user, and the screen of the LCD naturally gets dirty. Unfortunately, the LCD of a web phone has been enlarged every year in accordance with the development of Internet environment. Therefore, the structural problem of the Internet telephone is something to be solved in the long run.

As for another problem, when the handset is put on the cradle, the unstable handset due to the wide LCD makes the on/off operation of the hook switch unstable as well. Especially, the problem occurs as the handset moves from the left to the right side, and has a negative effect on the on/off operation of the hook switch, consequently deteriorating the reliability of the Internet telephone in overall.

There are a number of different designs for cradles to hold a handset, as illustrated by the above mentioned patents and as illustrated in the following patents: U.S. Pat. No. Des. 278,813 to Donald M. Genaro et al. entitled Housing For A Telephone Stand Or Similar Article, U.S. Pat. No. Des. 301,474 to Minoru Hotsumi et al. entitled Cradle For A Portable Radio Telephone Set, U.S. Pat. No. Des. 354,287 to Masaru Tokiyama entitled Telephone Handset Holder; and U.S. Pat. No. Des. 359,283 to Tomek Rudkiewicz entitled Cradle And Mobile Telephone Handset.

SUMMARY OF THE INVENTION

It is, therefore, an object of the present invention to provide a telephone having a cantilever beam type cradle.

It is another object of the present invention to provide a telephone having a handset and a cantilever beam type cradle where the handset is put on.

It is still another object of the present invention to provide a telephone having a handset where a weight balance is installed nearby a receiver.

It is still another object of the present invention to provide a telephone having a cradle and a handset that are tightly bound with each other by using a force between a magnet and a metal.

It is still another object of the present invention to provide a telephone having a handset free of a bilateral mobility.

To achieve the above object, there is provided a telephone, comprising a planar housing; a planar support connected to the bottom part of the planar housing for supporting the housing to rotate; a cantilever beam type cradle where a handset is put on, being extended to one side of the planar support; a handset to be put on the cantilever beam type cradle; and an angled support connected to the bottom part of the planar support for supporting the planar support to a tilt angle.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment of the present invention will now be described with reference to the accompanying drawings. The matters defined in the description are merely provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
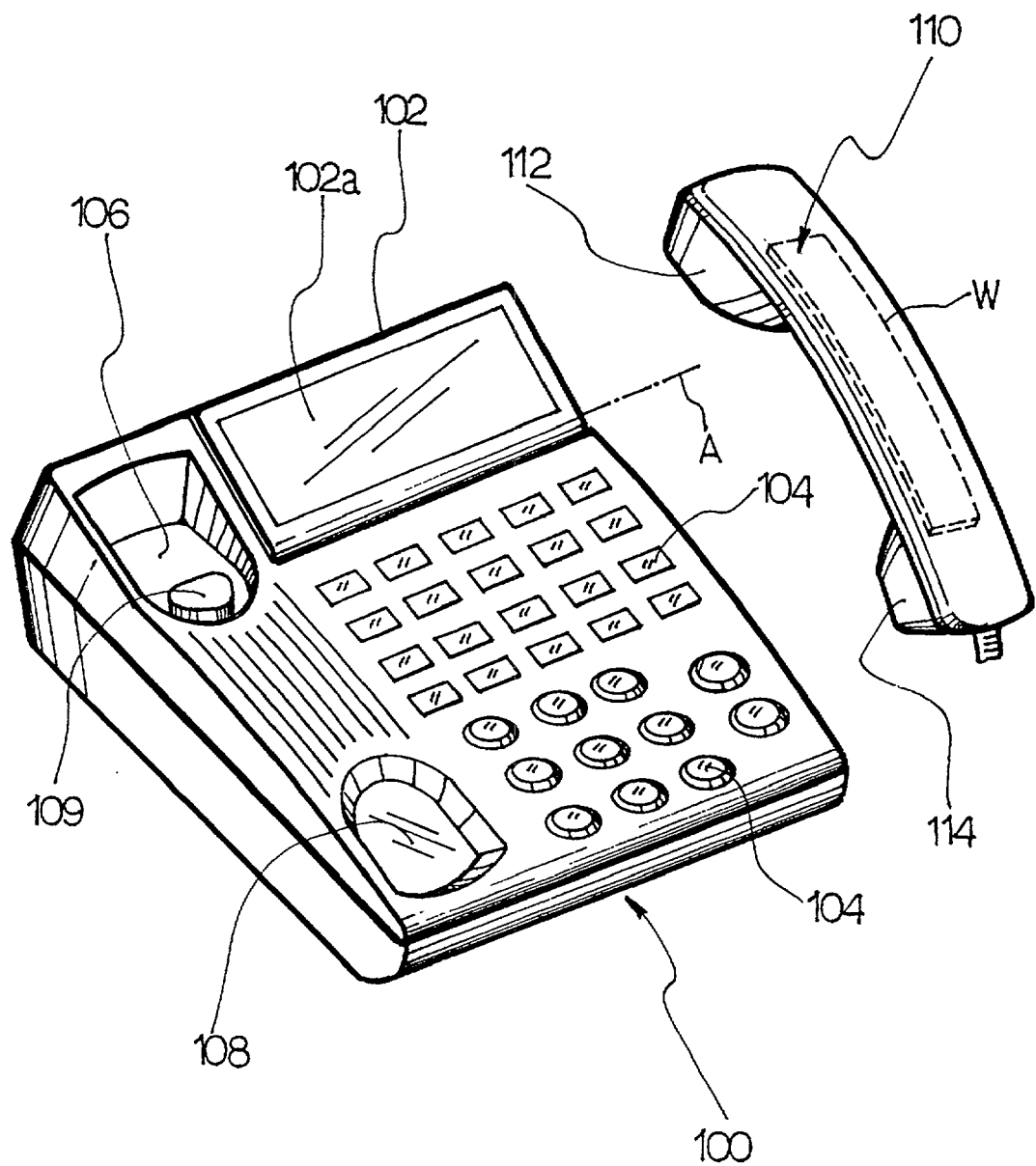
FIG. 1 is a perspective view showing a telephone with a handset according to an embodiment in related art.
Figure 2:
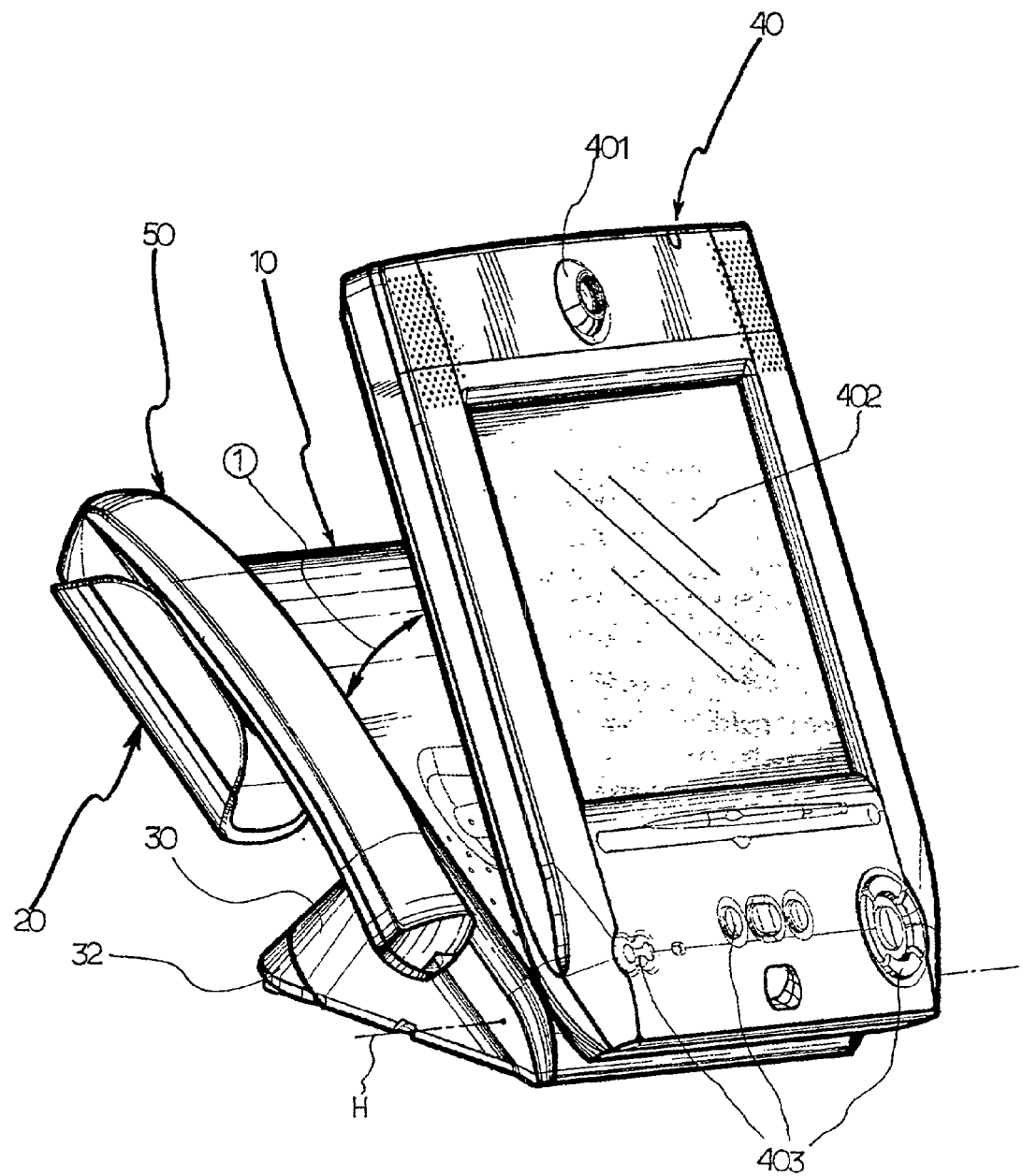
FIG. 2 is a perspective view showing a telephone with a cradle and a handset to be put on the cradle according to a preferred embodiment of the present invention.

FIG. 2 is a perspective view of a telephone with a cantilever beam type cradle 20 and a handset 50 for putting on the cantilever beam type cradle 20. The cantilever beam type cradle 20 and a handset 50 according to a preferred embodiment of the present invention is also applicable to other phones, for example, image phones, picture phones, web phones or web video phones as long as they require the cradle and handset. Through FIG. 2, it is shown how the handset 50 is put on the cradle 20.

As shown in the FIG. 2, the telephone according to the present invention is capable of performing a telephone function as well as an Internet communication function. Especially, the telephone is provided with a display device, more specifically, a wide LCD 402 and the cantilever beam type cradle 20 in order to carry out an image or picture Internet communication function.

According to the present invention, a large-sized wide LCD 402 is provided in order to help the user to check the displayed data more easily during the Internet communication with the other person. Additionally, a touch screen is displayed on LCD 402 in order to display a key pad used to dial a telephone number. Also, the cantilever beam type cradle 20 is provided in a way that the cradle 20 and LCD 402 do not interfere with each other, and the user can easily pick up the handset 50. That is, the lower part (the transmitter end) of the handset 50 is not put on the cradle 20 such that the user can pick up the handset 50 more freely.

When the handset 50 is put on the cantilever beam type cradle 20, the LCD 402 is on the right side of the handset, and the cantilever beam type cradle 20 is on the left side of the LCD 402. The cantilever beam type cradle 20 is provided to help the user to pick up the handset 50 more easily. On the other hand, the weight balance of the handset 50, which is further explained below, is provided to secure the stability of cradling the handset on the cantilever beam type cradle 20, and more particularly, ensure the precise on/off operation of the hook switch.

Also shown in FIG. 2 are a planar support 10 for supporting a wide LCD housing 40, an angled support 30 for supporting the planar support 10, an angled sub support 32 for supporting the angled support 30, wherein the cantilever beam type cradle 20 is extended to one side of the planar support 10.

LCD housing 40 frames LCD 402 and is planar. A lens 401 is positioned on the upper portion of the wide LCD 402, and a plurality of keys (buttons) 403 are arrayed below the wide LCD 402. The lens 401 is used for the image or picture communication facing the other person, and the keys 403 are used for the Internet communication, especially for a data communication with the other person, such as, E-mail transmission or chatting.

The LCD housing 40 is able to rotate around the hinge axis H of the planar support 10 by a hinge (not shown). Namely, the LCD housing 40 rotates, or tilts, in the direction indicated by the arrow arch ①, which is very helpful for the user at the time of picture communication with another person, since the LCD housing 40 can be adjusted to a certain angle appropriate for the picture communication. The planar support 10 is positioned a predetermined angle as supported by the angled support 30. Here, the angled support 30 supports the planar support 10, while the angled sub support 32 supports the angled support 30.

Figure 3:
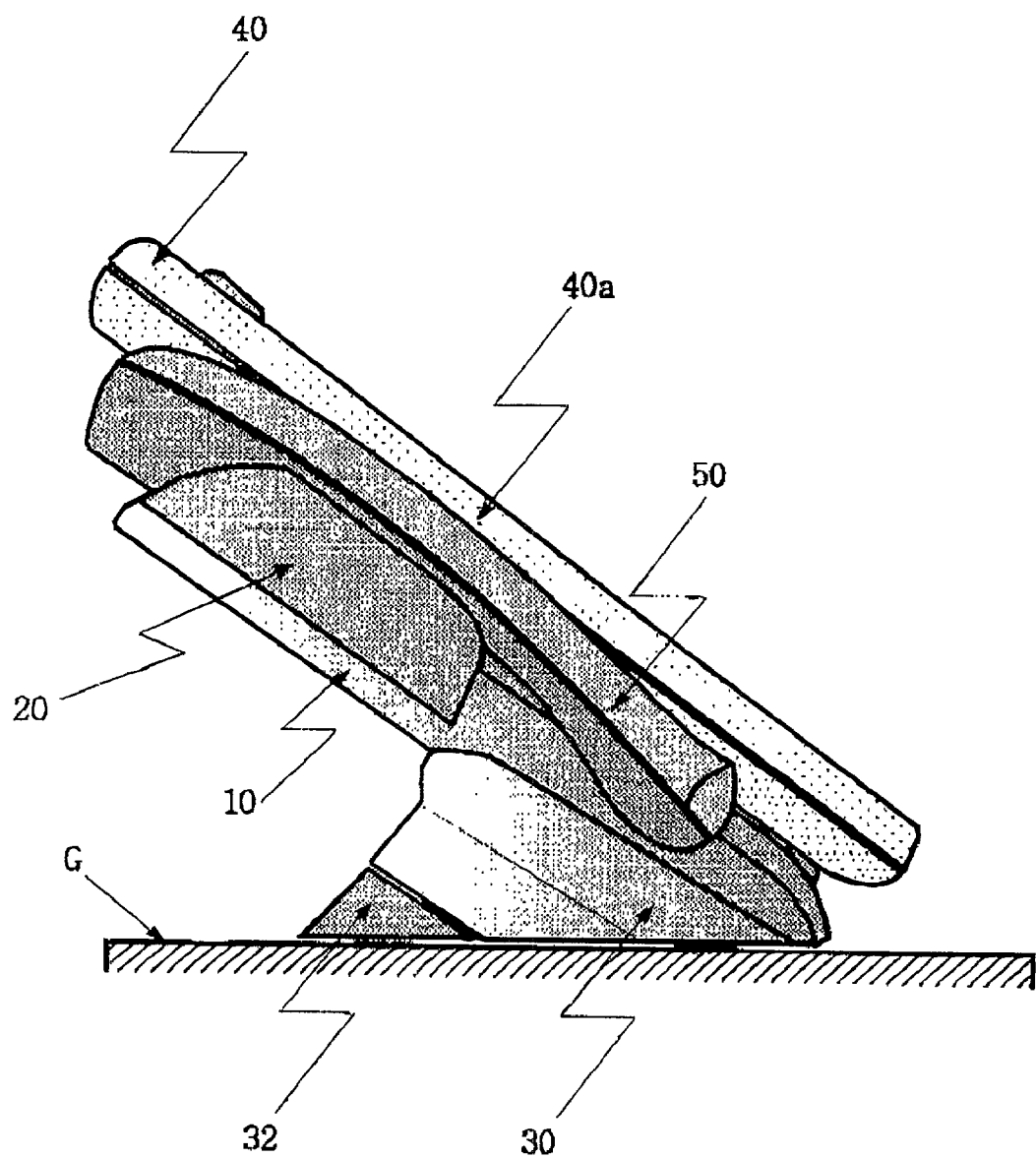
FIG. 3 is a side view showing a cradle and a handset put on the cradle according to a preferred embodiment of the present invention.

As shown in FIG. 3, according to a preferred embodiment of the present invention, where the telephone sits on a surface (desk top)G and the LCD housing 40 is closed next to planer support 10, the handset 50 is positioned lower than the face surface 40a of the LCD housing 40 as it is rests on the cantilever beam type cradle 20. In this way, it becomes much easier to cradle or to pick up the handset 50 without interfering with or touching the LCD 402.

Figure 4:
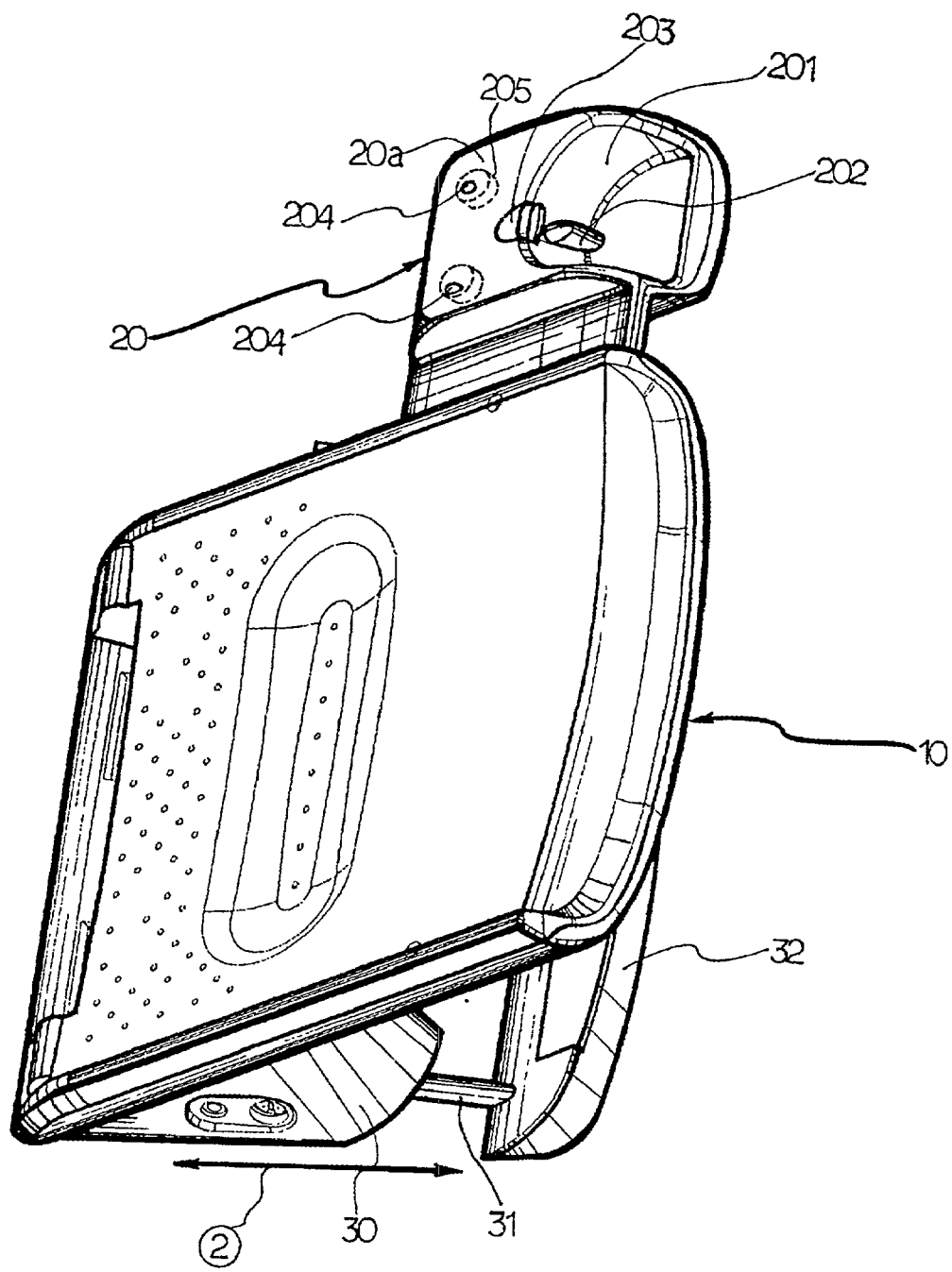
FIG. 4 is a top perspective view showing a cradle according to a preferred embodiment of the present invention.

With reference to FIG. 4, the cantilever beam type cradle 20 according to the present invention is explained. Before explaining the cantilever beam type cradle 20, the role of the angled sub support 32 is further explained. Angled sub support 32 can be moved horizontally as indicated by direction arrow ② to add further support to the angled support 30. The user can tilt the LCD housing 40 (not shown in FIG. 4) on the planar support 10 to a desired position. Therefore, if the user tilts the LCD housing 40 upwards to a large degree, the angled sub support 32 is withdrawn (moved away from angled support 30) completely along a guide rod 31 (a pair of guide rods) connecting the angled sub support 32 to the angled support 30, and makes the telephone stable in overall. That is, angled sub support 32 acts as a counter balancing means to counter the weight of the LCD housing 40. Moreover, if the user wishes to move the telephone to another place, he or she should insert the angled sub support 32 completely into the angled support 30 as shown in FIG. 3.

The cantilever beam type cradle 20 according to the present invention is now explained below.

The cantilever beam type cradle 20 is built to extend from one side of the planar support 10, and only the receiver of the handset is put on the cradle 20. To this end, the cantilever beam type cradle 20 includes a slot 201, on which the receiver is placed, a hook switch 202, which is projected on the slot 201, and a hanger 203, which is projected between the hook switch 202 and a top end (upper or facing surface) 20a of the cradle. Here, the slot 201 is where the projected part of the receiver of the handset 50 is put on, and the top end 20a is where the handset is touched.

Furthermore, at least one projection 204 for preventing left-right motions is projected above the top end 20a of the cantilever beam type cradle 20. Here, two projections 204 are projected above the top end 20a of the cradle 20, and preferably they are projected symmetrically in a shape of a circle or semicircle.

Figure 5:
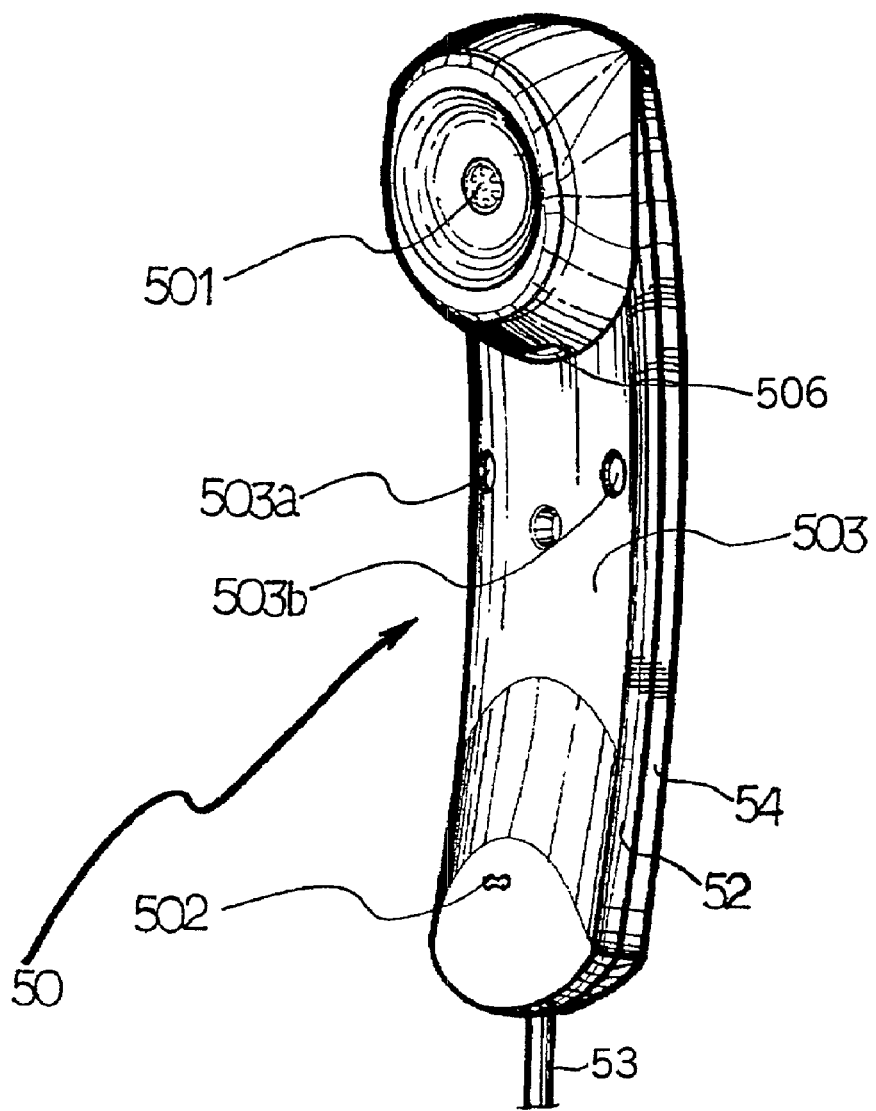
FIG. 5 is a perspective view showing a handset according to a preferred embodiment of the present invention.
Figure 6:
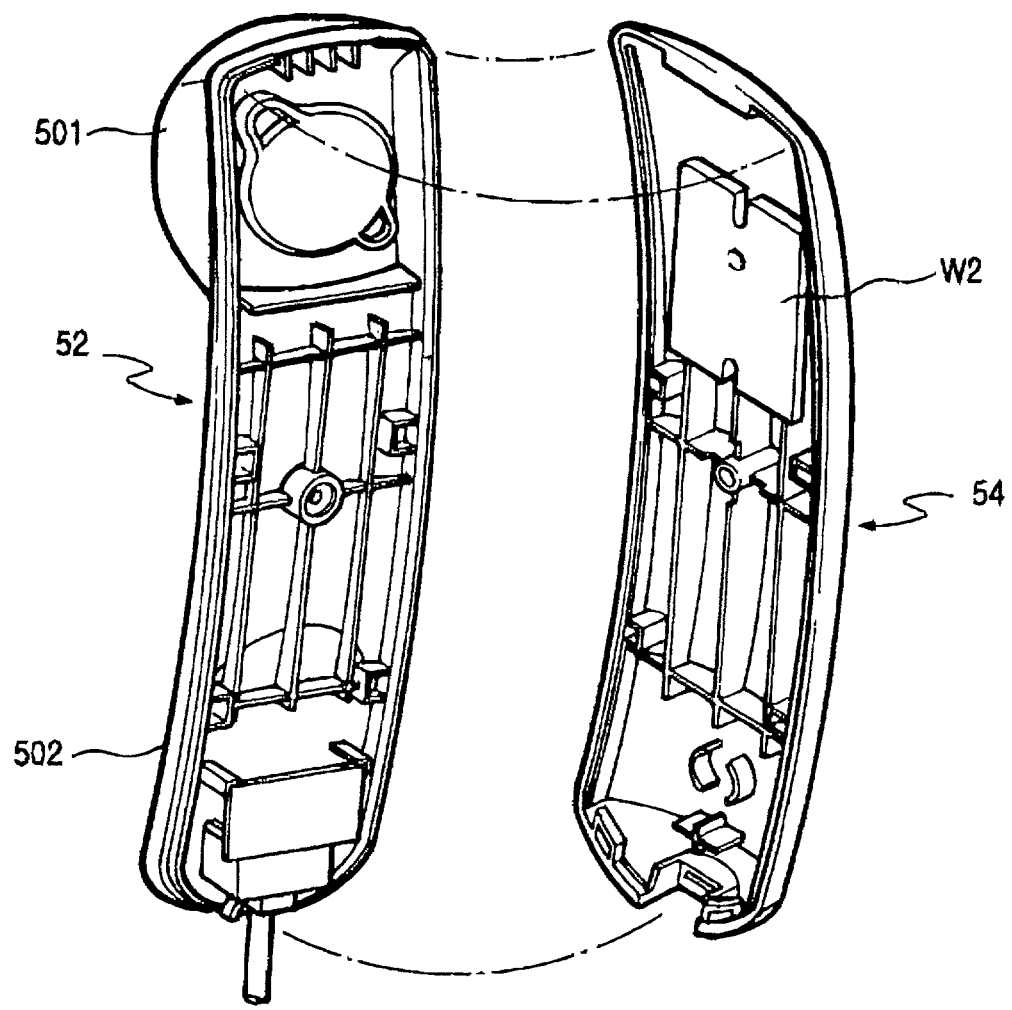
FIG. 6 is a sectional perspective view showing a handset according to a preferred embodiment of the present invention.

With reference with FIGS. 5 and 6, the construction of the handset according to the present invention is explained. Since only the receiver 501 of the handset 50 is cradled on the cantilever beam type cradle 20 as mentioned before, then only the receiver 501 of the handset 50 is projected. On the other hand, since the transmitter 502 of the handset 50 is not cradled on the cantilever beam type cradle 20 it can have just about any desired profile. Although it is perfectly fine if a part of the transmitter is projected, it is not necessary for the transmitter to have a projected shape at all. Rather, the transmitter can be planar instead. In addition, a holding portion 503 to enable the handset 50 to be hand held is provided between the receiver 501 and the transmitter 502. Therefore, when using the telephone, the user can hold this holding portion 503 or the transmitter 502 that are not cradled on the cradle 20. A catch 506 is shown in receiver 501 for mating with hanger 203 of cradle 20.

The handset 50 includes an front case 52 and a back case 54. Using a screw (not shown), the cases are connected to form one body. The essential role of the handset 50 on the cradle is to take the hook switch on or off precisely. For this purpose, the handset 50 is equipped, as shown in FIG. 6, with a weight balance W1 as a weight balancing means. The handset 50 must have at least one of the weight balance W1. Preferably, the weight balance is installed adjacent the receiver 501 of the handset 50 making the receiver be the center of gravity.

The handset 50 also comprises recesses 503a and 503b corresponding to the projections 204 shown in FIG. 4. When the handset 50 is put on the cantilever beam type cradle 20, the recesses 503a and 503b are mated with the projections 204 to provide cradle stability. More particularly, the union of the projections 204 and the recesses 503a and 503b prevents the handset 50 from moving bilaterally. FIG. 5 illustrates two bilaterally symmetrical recesses 503a and 503b. A portion of a curl cord for connecting the handset 50 and the LCD housing 40 using a wire is shown 53.

Figure 7:
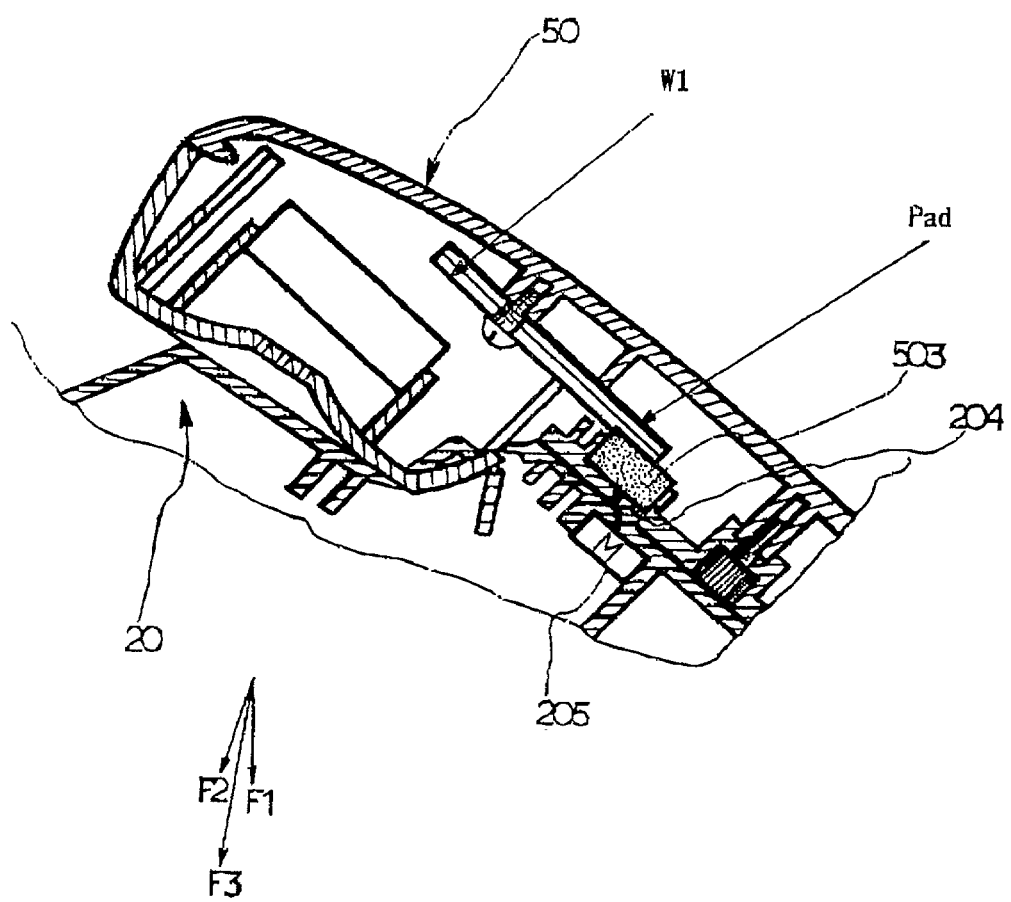
FIG. 7 is a cross sectional view showing a cradle and a handset put on the cradle.

With reference with FIGS. 6 and 7, the installation structure of the weight balance is now explained. As shown, the weight balance W1 of the handset 50 is mounted over a pad P1 to the back case 54 adjacent to the receiver 501 and secured in place with at least one screw. Thus, when the handset 50 is put on the cantilever beam type cradle 20, the weight balance W1 is placed very close to the cantilever beam type cradle 20.

As shown in FIG. 7, a magnet 205 is installed in the top end 20a of the cantilever beam type cradle 20, and the projection 204 is placed nearby the magnet 205. Additionally, the handset 50, besides the weight balance, further comprises a metal implement 505. The metal implement 505 is positioned nearby the weight balance W1, and more specifically, at a lower part of the weight balance. Accordingly, the magnet 205 attracts the metal implement 505 when the handset 50 is set in cradle 20.

When the handset 50 is put on the cantilever beam type cradle 20 according to the present invention, the metal implement 505 helps the handset 50 and the cradle 20 to be united more tightly, SO the metal implement 505 is generally placed closer to the receiver 501 than the magnet 205.

The magnetic force between the magnet 205 and the metal implement 505 heads toward the direction of the line of gravity of both sides. The metal implement 505 has a radius as big as a radius of the magnet 205.

As shown in FIG. 7, once the handset 50 is put on the cantilever beam type cradle 20, the self-weight of the metal implement 505 projects a perpendicular force F1, and the magnetic force F2 between the metal implement 505 and the magnet 205 is applied with an inclination of a designated angle of particular degrees. Therefore, the resultant force F3 of the force F1 and the force F2 heads toward a designated direction. At this time, the designated direction F3 is the direction for tightly drawing the handset 50 to the cradle 20. That is, the handset 50 of the present invention is very tightly cradled to the cradle 20, and becomes stable thanks to the binding force between the projections 204 and the grooves 503a and 503b that prevents any bilateral motion. In this manner, the handset 50 is capable of directing a more precise on/off operation of the hook switch.

In conclusion, the telephone with the cantilever beam type cradle according to the present invention helps the user to pick up the handset more easily. Moreover, the telephone of the present invention provides the cradle with stability by installing the weight balance nearby the receiver of the handset, and the on/off operation of the hook switch becomes more precise. While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A telephone, comprising:
   a planar housing;
   a planar support connected to a lower portion of the planar housing for rotationally supporting the planar housing, said planar housing being rotatable through various angles up to a predetermined angle;
   a handset having a protruding receiver end portion, a transmitter end portion and a holding portion connecting the protruding receiver end portion to the transmitter end portion;
   a cantilever beam type cradle for receiving said protruding receiver end portion of said handset, said cantilever beam type cradle being extended from one side of the planar support, wherein said transmitter end portion and a part of said holding portion hang away from said cantilever beam type cradle and do not contact said cantilever beam type cradle; and
   an angled support connected to the bottom part of the planar support for holding the planar support at a non-horizontal acute angle.

2. The telephone of claim 1, wherein said angled support includes an angled sub-support expendibly attached to said angled support by at least one guide rod.

3. The telephone of claim 1, wherein the handset comprises at least one weight balance being installed adjacent said protruding receiver end portion.

4. The telephone of claim 3, further comprising:
   a metal implement installed in said handset adjacent said weight balance and closer to said transmitter end portion of said handset than said weight balance; and
   a magnet installed in said cantilever beam type cradle, said magnet being closer to said transmitter end portion of said handset than said metal implement when said handset is properly set in said cantilever beam type cradle.

5. The telephone of claim 4, wherein the metal implement has a radius as big as a radius of the magnet, and a magnetic force between the metal implement and the magnet tightly bind the handset into the cantilever beam type cradle.

6. The telephone of claim 1, wherein said planar housing houses:
- a display screen;
- a plurality of buttons; and
- a camera.

7. The telephone of claim 6, wherein said display screen is a liquid crystal display screen.

8. The telephone of claim 1, said cantilever beam type cradle further comprising:
- a slot for receiving said protruding receiver end portion of said handset, said slot being formed below an upper surface of said cantilever beam type cradle;
- a hook switch positioned in said slot for controlling a hook on or a hook off operation of said telephone; and
- at least one projection extending above the upper surface of said cantilever beam type cradle, said at least one projection corresponding to at least one recess formed in the holding portion of said handset.

9. The telephone of claim 8, wherein an upper surface of said handset, when said handset is properly positioned in said cantilever beam type cradle, is lower than a front face surface of said planar housing.

10. The telephone of claim 1, wherein the telephone is one of an image phone, a picture phone, a web phone or a web video phone.

11. A telephone, comprising:
- a planar housing having a display screen framed by said planar housing;
- a planar support hinged to a lower portion of the planar housing for rotationally supporting the planar housing, said planar housing being rotatable through various angles up to a predetermined angle;
- a handset having a receiver end portion, a transmitter end portion and a holding portion connecting the receiver end portion to the transmitter end portion;
- a cradle for receiving said receiver end portion of said handset, said cradle being extended from one side of the planar support for supporting said handset in a cantilevered manner such that said transmitter end portion and a part of said holding portion of said handset hang away from said cradle and do not contact said cradle when said receiver end portion of said handset is properly positioned in said cradle; and
- an angled support connected to the bottom part of the planar support for holding the planar support at a non-horizontal acute angle.

12. The telephone of claim 11, wherein said angled support includes an angled sub-support expendibly attached to said angled support by at least one guide rod.

13. The telephone of claim 11, wherein the handset comprises at least one weight balance being installed adjacent said receiver end portion.

14. The telephone of claim 13, further comprising:
- a metal implement installed in said handset adjacent said weight balance and closer to said transmitter end portion of said handset than said weight balance; and
- a magnet installed in said cradle, said magnet being closer to said transmitter end portion of said handset than said metal implement when said handset is properly set in said cradle.

15. The telephone of claim 14, wherein the metal implement has a radius as big as a radius of the magnet, and a magnetic force between the metal implement and the magnet tightly bind the handset into the cantilever beam type cradle.

16. The telephone of claim 11, wherein said planar housing houses:
- a plurality of buttons; and
- a camera.

17. The telephone of claim 11, wherein said display screen is a liquid crystal display screen.

18. The telephone of claim 11, said cradle further comprising:
- a slot for receiving said receiver end portion of said handset, said slot being formed below an upper surface of said cantilever beam type cradle;
- a hook switch positioned in said slot for controlling a hook on or a hook off operation of said telephone;
- a hanger extending in said slot and above the upper surface of said cradle, said hanger corresponding to a catch formed in said receiver end portion of said handset; and
- at least one projection extending above the upper surface of said cradle, said at least one projection corresponding to at least one recess formed in the holding portion of said handset.

19. The telephone of claim 11, wherein an upper surface of said handset, when said handset is properly positioned in said cantilever beam type cradle, is lower than a front face surface of said planar housing.

20. The telephone of claim 11, wherein the telephone is one of an image phone, a picture phone, a web phone or a web video phone.

* * * * *